Patented Oct. 8, 1935

2,016,318

UNITED STATES PATENT OFFICE 2,016,318

PROCESS OF MAKING A DEHYDRATED FLOUR MIX

John D. Duff, Pittsburgh, and Louis E. Dietrich, Crafton, Pa., assignors to P. Duff & Sons, Inc., a corporation of Pennsylvania No Drawing. Application June 13, 1933, Serial No. 675,647

6 Claims. (Cl. 99—10)

This invention relates to a process of making a dehydrated flour mix and the product thereof for use in making pastry products and is in part a continuation of our copending applications 501,468, filed December 19, 1930 and 675,646, filed June 13, 1933, which have respectively matured into Patent No. 1,931,892 of October 24, 1933 and Patent No. 1,959,466 of May 22, 1934.

The defects and disadvantages of prior procedure have been pointed out in our aforesaid copending applications. In addition, many processes result in bulky and difficultly handleable mixtures with the result that lack of uniformity exists in the mixture and large and expensive apparatus is required for the processing of the materials.

One of the objects of the present invention is to further simplify the processes of our copending applications and to provide a process which is capable of increasing the rate of production of the product without added expense.

Another object is to so process certain materials that a non-harmfully hygroscopic flour is produced which can be made expeditiously and inexpensively and which at the same time is readily adapted to be converted into an edible product by adding moisture and then cooking or baking.

A further object is to provide a process wherein no dough or the like is or need be formed with the result that the drying apparatus turns out material at an increased rate of production due to its greater effective capacity and the greater drying effectiveness due to absence of flour.

A still further object is to provide a process wherein molasses and shortening, with or without sugar and salt, are emulsified and then dried to form a hard, dry intermediate mass which is then pulverized and the mix completed by adding thereto (wheat) flour and other predetermined dry ingredients.

Other and further objects and advantages will be understood by those skilled in this art or will be apparent or pointed out hereinafter.

A preferred composition for making an edible pastry product, for example, gingerbread, contains substantially the following ingredients in substantially the following proportions:

|  | Pounds | Percent |
|---|---|---|
| Wheat flour | 100 | 43.0 |
| Molasses | 100 | 43.0 |
| Sugar | 11 | 4.8 |
| Shortening | 11 | 4.8 |
| Salt | ½ | 0.2 |
| Baking soda | 3 | 1.3 |
| Powdered whole egg | 6 | 2.6 |
| Powdered ginger | ½ | 0.2 |
| Powdered cinnamon | ½ | 0.1 |

In setting forth the above ingredients, it is to be understood that they are purely exemplary or typical and are not intended in a limitative sense since any one or all of them may be varied within relatively wide limits depending upon the conditions encountered and upon the precise nature of the product to be made as well as the characteristics which it is desired the product shall have.

Of the above ingredients, in substantially the proportions set forth, we first emulsify the molasses and shortening with or without the sugar and salt. To do this we place the molasses and shortening in the bowl of a dough mixing machine (and the sugar and salt when they are used at this stage) wherein they are suitably agitated while heat is simultaneously applied. Such heat, for example, may be added in any convenient way such as by the insertion of a steam coil in the bowl of the mixing machine or by using a jacketed bowl within which steam or other heating medium may be circulated, or by any other suitable heating means. We continue the heating and agitation until the shortening is thoroughly melted and until an emulsion is formed at least between the molasses and shortening. When sugar and salt are present at this stage they dissolve in the molasses and the resultant emulsion, therefore, contains all these ingredients and is a stable emulsion. It is clear that we may either add the sugar and salt during the formation of the emulsion or we may add them later on in the process with the other predetermined dry ingredients.

When the emulsion is completed and in the condition recognized as being suitable for the next stage in the process, we then dry the emulsion. It is clear that such an emulsion is relatively thin as to fluidity, but at the same time is very concentrated thus resulting in the introduction into a given batch of a greater amount of the ingredients contained in the emulsion.

We may dry the emulsion in any suitable way such as by a spray drier or in the pans of a vacuum shelf drier of the kind and under the conditions set forth in our copending application 675,646, filed June 13, 1933 and now matured into Patent No. 1,959,466 of May 22, 1934. Where we dry the emulsion in the shelf drier, the emulsion is poured into the pans thereof and placed on the shelves of the drier. The depth of emulsion in the pans is that dictated by judgment and good practice so that during the drying operation no overflow will occur.

After the emulsion has been poured into the pans and placed within the shelf drier the emulsion is subjected to a temperature in the neighborhood of 160 to 170° F., which we term a mild heat, and simultaneously to a vacuum which in a typical instance is equivalent to 28 to 29 inches although the precise degree of vacuum may be considerably varied depending upon the time available for drying and other factors, as will be understood by those familiar with the use of vacuum apparatus. In such drier the emulsion is converted into a hard, dry intermediate mass in which the individual ingredients are individually unidentifiable as such. We believe that a new physico-chemical interrelationship has been brought about between the various ingredients and at least between the shortening and the molasses which puts the material into a condition more favorably disposed for the production of the product. We believe this to be true due to the fact that in the hard, dry intermediate mass we are unable to identify the individual ingredients, either by chemical or by microscopical examination.

After we have obtained the dry, hard intermediate mass, which may take from about 2 to 3 hours, more or less, in the vacuum oven we remove this product from the oven and subject it to a pulverizing or grinding action so as to reduce it to a suitable mesh which, merely as an example, may be about 20 mesh. The important requisite is that the dried emulsion shall be reduced to a suitable state of fineness or subdivision so that it may be thoroughly incorporated with the other dry ingredients, which are thereafter added. If we so desire and depending upon circumstances and the precise condition of the hard, dry intermediate mass we may add some of the remaining ingredients such, for example, as the wheat flour during the grinding operations as this seems to be advantageous and to facilitate the grinding. If we so prefer, however, we may grind the dried emulsion by itself and then thoroughly mix in the flour and the remaining predetermined ingredients in dry form in any desirable way such as in a mixing machine or by raking and scooping operations on a suitable slab or the like.

The shortening may consist of a hydrogenated edible vegetable oil or fat such as cotton seed oil or the like or a suitable animal fat such as lard. The shortening may in addition be in semi-solid or liquid form, if desired, and since such shortenings are of higher grade than solid shortenings, the present process offers the further advantage that high grade shortenings, which need not be hydrogenated and which thus further improve the texture and flavor of the pastry product, may be used.

The above is intended more in an illustrative than in limitative manner and we contemplate such modifications, substitutions, additions, or omissions depending upon the precise product desired and the other conditions encountered as brought out in our copending applications. By the present invention we may make, for example, different types of flours for the production of different types of edible products such as brown breads, spice cakes, bran cakes, devil's food cakes and the like. Suitable variations in the percentages of the above stated ingredients are made according to known practice or in some cases certain ingredients may be omitted where their characteristics are not required for the particular product. This too, we have likewise set forth in our copending applications.

What we claim as new and desire to secure by Letters Patent is:

1. The process of making a non-harmfully hygroscopic mix capable of being cooked or baked to form a food product for human consumption which comprises the steps of emulsifying molasses and shortening below boiling temperature, drying the same to form a hard dry intermediate mass, pulverizing such mass to a suitable state of subdivision, and thereafter adding flour and other predetermined dry ingredients to complete the mix.

2. The process of making a non-harmfully hygroscopic mix which comprises the steps of forming an emulsion of molasses and shortening under heat and agitation, drying the same under mild heat and vacuum to form a hard, dry intermediate mass, pulverizing the mass to powder form and adding thereto flour and other predetermined dry ingredients to complete the mix.

3. The process of making a non-harmfully hygroscopic "flour" which includes the steps of emulsifying molasses, shortening, sugar and salt under heat and agitation, subjecting the emulsion to the action of 160–170° F. under a vacuum of about 28–29 inches to produce a hard, dry intermediate mass, grinding such mass to pulverulent form and adding thereto flour and other predetermined dry ingredients to complete the mix.

4. A process of the character described comprising emulsifying at least shortening and molasses under heat and agitation to produce a stable emulsion which readily flows, introducing the same into a vacuum oven to dry the same to form a hard, dry intermediate mass, reducing such mass to finely divided condition, and thereafter thoroughly mixing in flour and other dry ingredients according to and to form the ultimate desired product, the molasses constituting about the same percentage of the final product as the flour.

5. The process of making a dehydrated flour mix including the steps of mixing molasses, shortening, sugar and salt and simultaneously heating and agitating the same, whereby the sugar and salt dissolve in the molasses and the shortening melts, thus forming a homogeneous emulsion, drying said emulsion to form a hard, dry mass, reducing it to a powder of suitable mesh, and mixing in flour, baking soda, powdered whole egg, powdered ginger and powdered cinnamon to complete the mix.

6. A process of introducing liquid molasses into a mix which is ultimately in pulverulent form and capable of being converted to an edible product comprising emulsifying molasses and a suitable shortening agent, drying the emulsion to form it into a hard cake-like product by suitably extracting the moisture from the emulsion, reducing the dry hard cake-like product to powder form and adding in dry form appropriate ingredients, including flour, in such proportions as will complete the mix.

JOHN D. DUFF.
LOUIS E. DIETRICH.